(12) United States Patent
Wu et al.

(10) Patent No.: US 8,033,031 B2
(45) Date of Patent: Oct. 11, 2011

(54) ROTATION ANGLE SENSOR

(75) Inventors: Hui Wu, Guangdong (CN); Xianwei Cui, Guangdong (CN)

(73) Assignee: Guangdong Coagent Electronic Science & Technology Co., Ltd., Guangdong (CN)

( * ) Notice: Subject to any disclaimer, the term of this patent is extended or adjusted under 35 U.S.C. 154(b) by 0 days.

(21) Appl. No.: 13/059,880

(22) PCT Filed: Sep. 22, 2008

(86) PCT No.: PCT/CN2008/001633
§ 371 (c)(1),
(2), (4) Date: Feb. 18, 2011

(87) PCT Pub. No.: WO2010/025588
PCT Pub. Date: Mar. 11, 2010

(65) Prior Publication Data
US 2011/0146094 A1   Jun. 23, 2011

(30) Foreign Application Priority Data
Sep. 5, 2008   (CN) .......................... 2008 1 0198348

(51) Int. Cl.
*G01B 7/30* (2006.01)
(52) U.S. Cl. .......................................... 33/534; 33/1 PT
(58) Field of Classification Search .................. 33/1 PT, 33/534
See application file for complete search history.

(56) References Cited

U.S. PATENT DOCUMENTS

| 6,341,426 | B1 * | 1/2002 | Okumura | 33/1 PT |
| 6,848,187 | B2 * | 2/2005 | Ito et al. | 33/1 PT |
| 7,200,515 | B2 * | 4/2007 | Sakabe et al. | 33/1 PT |
| 7,637,020 | B2 * | 12/2009 | Maier et al. | 33/1 PT |
| 7,855,552 | B2 * | 12/2010 | Steinich | 33/1 PT |
| 2003/0177649 | A1 * | 9/2003 | Ito et al. | 33/1 PT |
| 2008/0148580 | A1 * | 6/2008 | Maier et al. | 33/1 PT |
| 2011/0131821 | A1 * | 6/2011 | Goll et al. | 33/1 PT |
| 2011/0146094 | A1 * | 6/2011 | Wu et al. | 33/534 |

FOREIGN PATENT DOCUMENTS
TW   2010/025588 A1   3/2010
* cited by examiner

*Primary Examiner* — Yaritza Guadalupe-McCall
(74) *Attorney, Agent, or Firm* — WPAT, P.C.; Anthony King

(57) ABSTRACT

A rotation angle sensor has a moveable sleeve (1) coupled with a rotating shaft, and a box (3) connected with the movable sleeve (1) rotatablely. An upper part of the moveable sleeve is equipped with a threaded ring (5). An inner side of the threaded ring (5) is equipped with a locking mechanism (6) which is matched with the rotating shaft tightly. The periphery of the threaded ring (5) is screwed with a fixed ring (7). The movable sleeve (1), the threaded ring (5) and the fixed ring (7) are all coaxial detachable ring structure comprising two or more arc modules. Teeth are distributed on an outer edge of the movable sleeve (1) along the circumferential direction. A reduction gear, which is engaged with the teeth and provided with multiple gears sets, is installed in the box (3). The reduction gear is fixed on a circuit board module, and a sensor module is fixed on the periphery of the reduction gear.

9 Claims, 6 Drawing Sheets

ROTATION ANGLE SENSOR

BACKGROUND OF THE INVENTION

1. Field of the Invention

The present invention relates to an angle sensor; and more particularly to a sensor that is capable of sensing rotation angles.

2. Brief Description of the Related Art

Rotation angle sensors are commonly used in lathe, electromechanical apparatus, vehicle, ship and airplane to detect the rotational speed or angle of the rotating shaft structures thereof. The sensor can be different kinds such as inductive, resistive, capacitive, photoelectric or other types. Chinese Patent No. 200720063163.X, and the filing date was at May 5, 2007. The name of invention is "The display device for detecting the rotation angle through vehicle turning", and it disclosed an angle sensor installed in the vehicle rotational mechanism, wherein the angle sensor is coupling with a signal processing circuit, and the signal processing circuit is coupling with a display circuit. This prior art is capable of displaying vehicle rotation angle by the display circuit, thereby assists with the vehicle control and increases driving safety. However, the existing angle sensors are difficult install and usually require disassembling of the whole device thereof while installing. Further, detecting the rotational speed or angle of the rotating shaft structures by the existing angle sensors has the problem of poor accuracy and stability.

SUMMARY OF THE INVENTION

In order to overcome the deficiencies of the prior art, a primary object of the present invention is to provide a rotation angle sensor that is of easy installation, simple structure, stable performance and accurate detection.

With the above object in mind, the present invention provides a rotation angle sensor comprising a movable sleeve that fits with a rotating shaft and movably attached to a box. The upper section of the movable sleeve is disposed of threaded ring, and the inner side of the threaded ring provides a locking mechanism that is correspondingly connected to the rotating shaft. A fixed ring is screwly connected to periphery edge of the threaded ring. The movable sleeve, the threaded ring and the fixed ring are all split-ring structures and comprise at least two concentric and coaxial arc-shaped components. Cogs are disposed along the periphery edge of the movable sleeve, and the box provides a gear reduction device comprising multi grade gears which is matched by cogs. The gear reduction device is fixedly joined to a circuit board component, wherein a sensing component is adjacently connected thereof.

The foregoing arc-shaped component has a ring connecting piece movably disposed at the bottom thereof, and the ring connecting piece provides a plurality of rivet holes along its periphery edge. Riveting column inside the rivet hole fixedly joins the ring connecting piece to the movable sleeve. The ring connecting piece comprises at least two connecting components corresponding to the arc-shaped components; the end part of the connecting component provides a hole slot, and between the two adjacent connecting components, a buckling piece that buckles with the hole slot is disposed thereof.

The locking mechanism comprises a plurality of fixing pieces that is attached to the inner wall of the threaded ring; an engaging component provided at the outer surface of the fixing piece engages with the upper section of the movable sleeve. The internal movable sleeve provides a plurality of positioning holes, and the bottom of the engaging component is disposed of a positioning shaft that is capable of movably attaching to the positioning holes. A slant surface is disposed at the upper section of the engaging component, and a concave groove is disposed at the lower section of the threaded ring to lodge with the slant surface thereof. The fixed ring of the threaded ring presses on the slant surface and movably connected thereon.

The inner surface of the fixing piece is an anti-skid surface corresponding to the surface of the rotating shaft; the anti-skid surface is disposed of cogs.

The foregoing box comprises a base and a dust-proof hood, and the end part of the box extends as a semicircular fixing structure corresponding to the movable sleeve. The top end of the semicircular fixing structure is connected to a corresponding semicircular ring, and the inner side of the semicircular ring and the semicircular fixing structure are disposed of a plurality of rolling bodies around the shaft center, and the movable sleeve and the rolling bodies are movably connected thereof.

The box is further disposed of a connecting drawbar at the lateral section thereof to support and fixedly join the whole device to the vehicle stud; the connecting drawbar comprises a front drawbar, a back drawbar, and a fixing block that hinged with the back drawbar. The front drawbar and the back drawbar assemble to form a length adjustable bar component.

The fixing block sets a conical slot, and a plurality of holes that match with studs of different diameters is disposed therein.

The gear set of the gear reduction device and the cogs disposed along the periphery edge of the movable sleeve form a five-grade gear reduction structure, and the sensing component near the structure uses the non-contact sensing electromechanical transformation circuit.

The present invention can achieve the following advantages:

1. The movable sleeve, the threaded ring of the upper movable ring and the fixed ring of the outer threaded ring are all use two concentric and coaxial arc-shaped components including two semicircular structure components. This allows the installation to be easy without any disassembling. Further, this also allows a sensing of any angles, and has no limits on the rotation numbers ($n \times 360°$, $n=\infty$).
2. The movable sleeve is driven by the rotating shaft of the measured object, and by the five-grade gear reduction structure to achieve a low rotation ratio conversion, and by the application of the non-contact sensing electromechanical transformation circuit; it is able to obtain an accurate rotation angle data.
3. The box disposes a connecting drawbar at the lateral section thereof to support and fixedly join the whole device to the vehicle stud, and the length and angle of the connecting drawbar are both adjustable and thereby allowing an easier installation; further, this design allows the movable sleeve to have a same rotation angle for the rotating shaft all time, thereby guarantees the accuracy of the detecting data.

BRIEF DESCRIPTION OF THE INVENTION

DETAILED DESCRIPTION OF THE PREFERRED EMBODIMENTS

Figure 1:
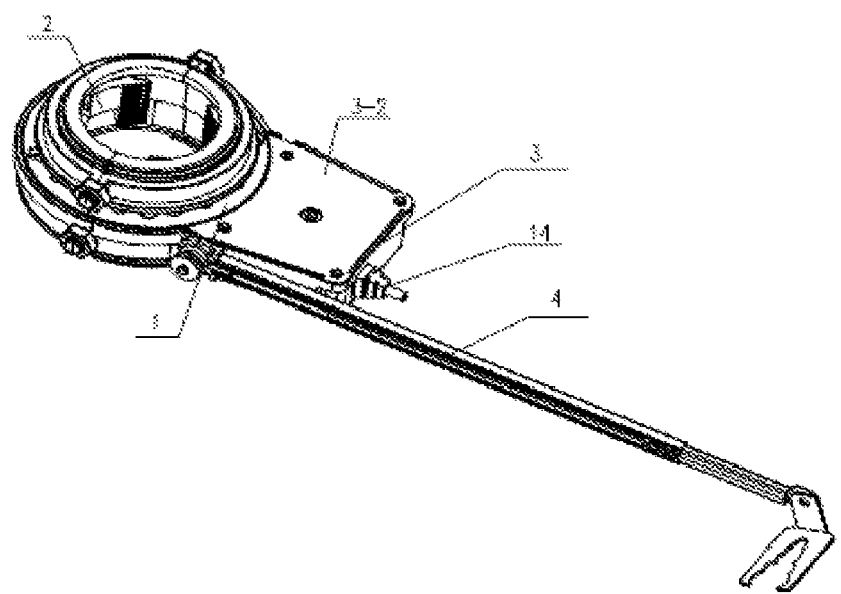
FIG. 1 is a perspective diagram of the rotation angle sensor structure according to the present invention.
Figure 2:
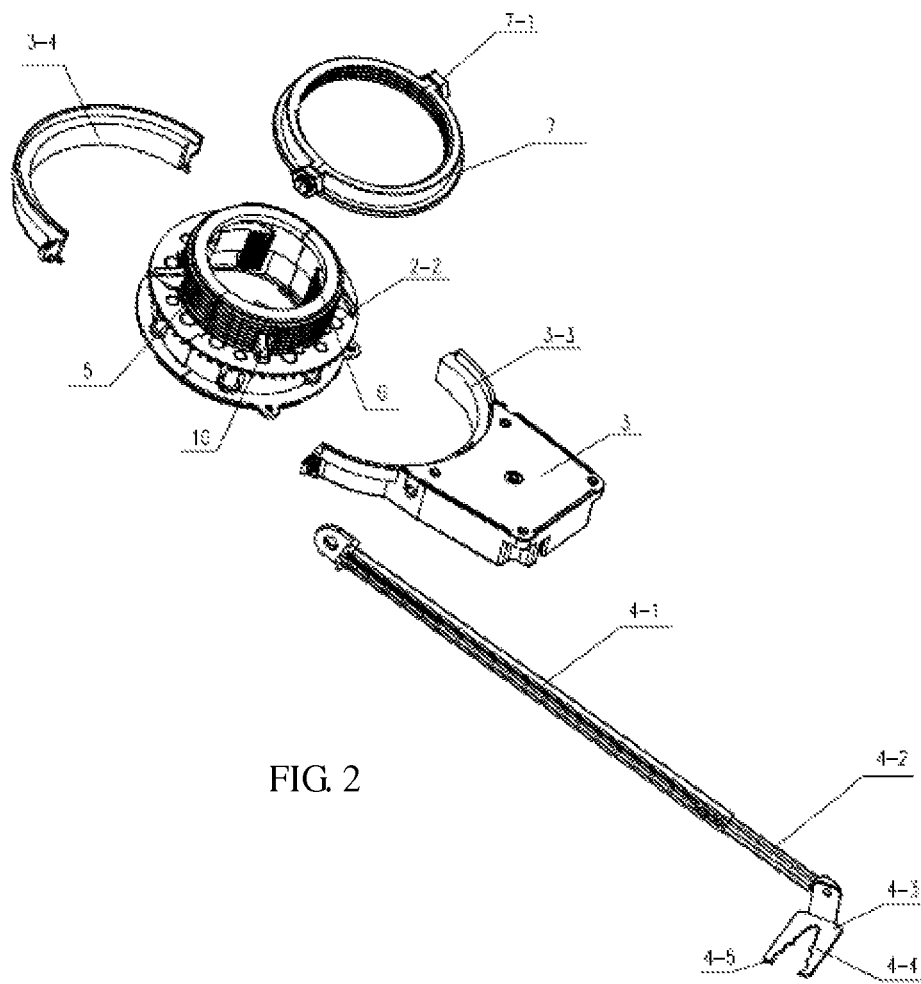
FIG. 2 is an exploded diagram of the rotation angle sensor structure according to the present invention.
Figure 3:
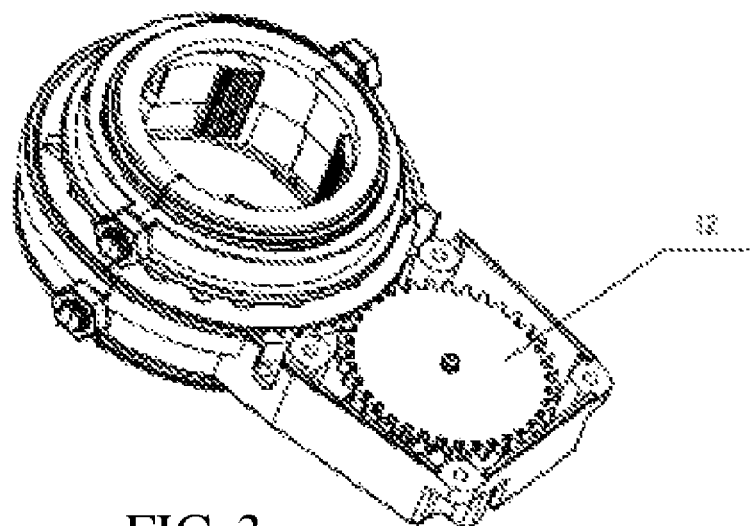
FIG. 3 is a schematic diagram of the inside of the rotation angle sensor structure according to the present invention.
Figure 4:
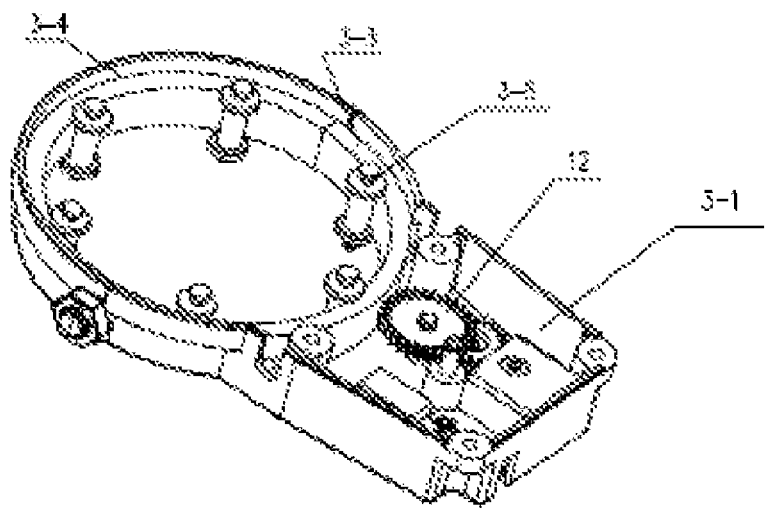
FIG. 4 is a schematic diagram of the box of the rotation angle sensor structure according to the present invention.
Figure 5:
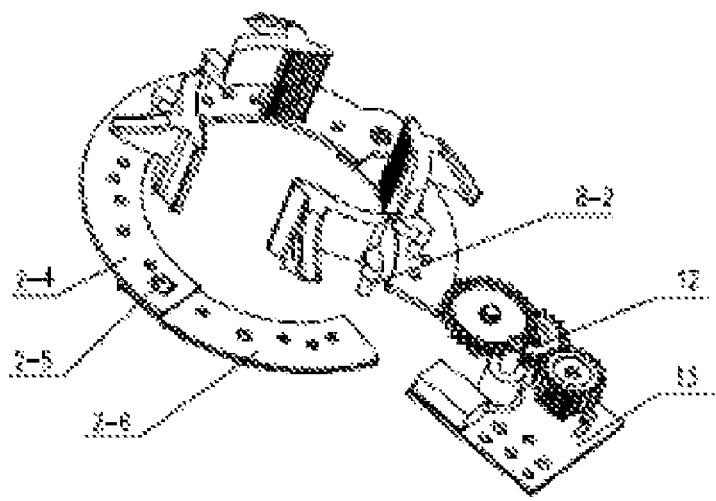
FIG. 5 is a schematic diagram of the assemblies inside the box of the installation component structure according to the present invention.
Figure 6:
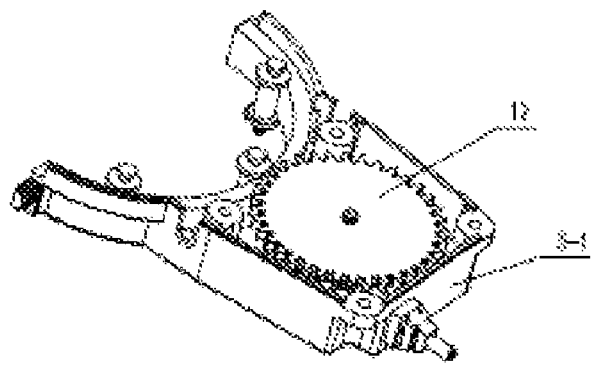
FIG. 6 is a schematic diagram of part of the bottom base of the box according to the present invention.
Figure 7:
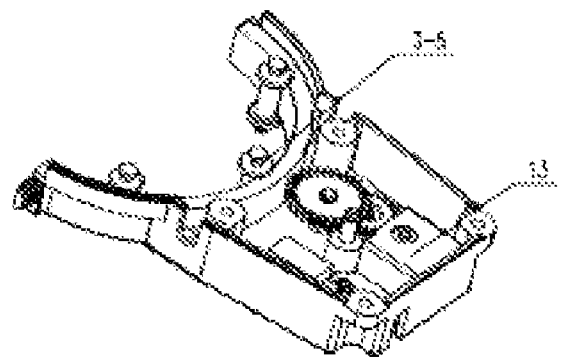
FIG. 7 is a schematic diagram illustrating the installation of the assemblies inside the box according to the present invention.
Figure 8:
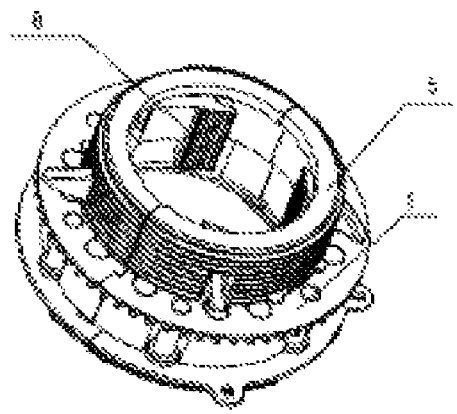
FIG. 8 is a schematic diagram of the rotating part of the rotation angle sensor structure according to the present invention.
Figure 9:
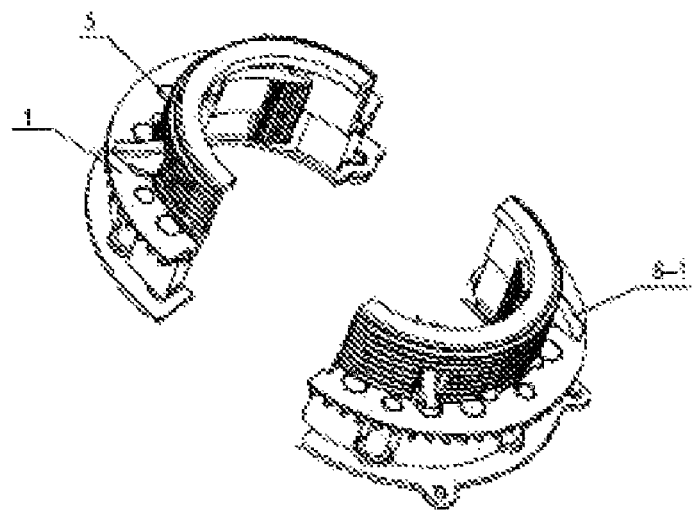
FIG. 9 is a schematic diagram illustrating the installation of the movable sleeve of the rotation angle sensor structure according to the present invention.
Figure 10:
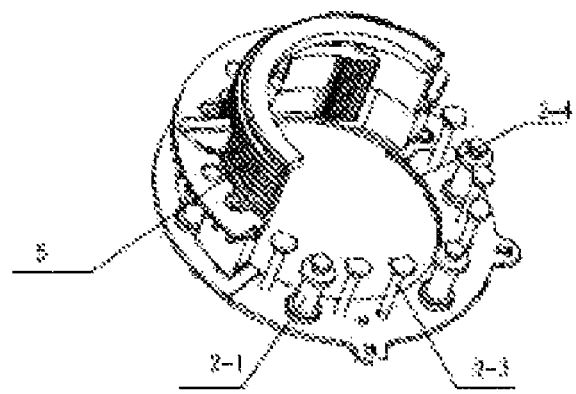
FIG. 10 is a schematic diagram illustrating the partial installation of the rotating part of the rotation angle sensor structure according to the present invention.
Figure 11:
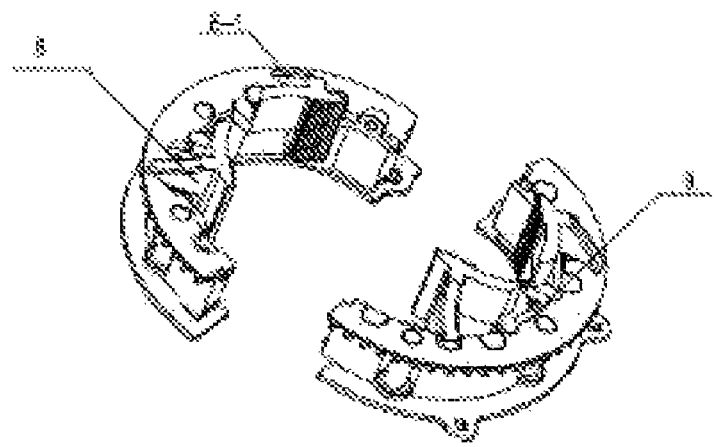
FIG. 11 is a schematic diagram illustrating the assembling of the movable sleeve according to the present invention.
Figure 12:
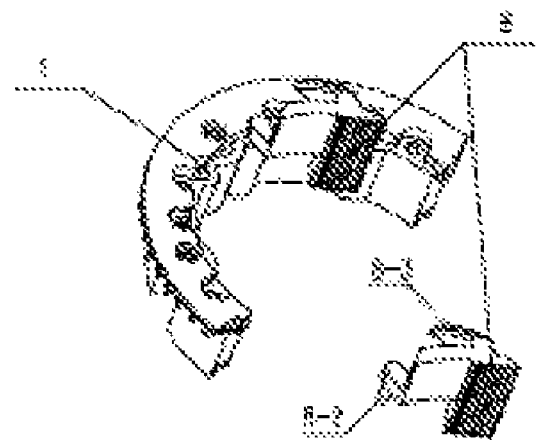
FIG. 12 is a schematic diagram of semicircular arc-shaped component of the movable sleeve according to the present invention.
Figure 13:
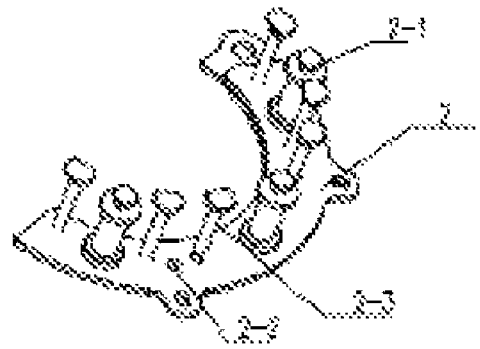
FIG. 13 is a schematic diagram illustrating the fixing assemblies of the movable sleeve according to the present invention.
Figure 14:
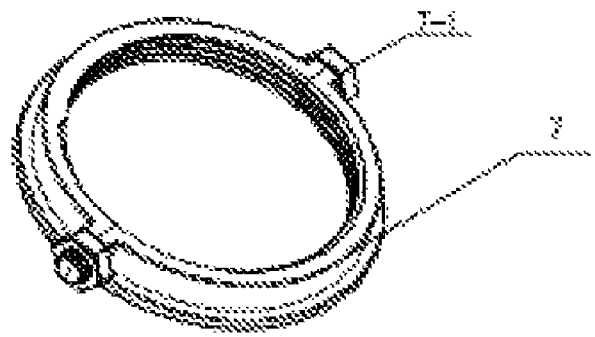
FIG. 14 is a schematic diagram of fixed ring according to the present invention.
Figure 15:
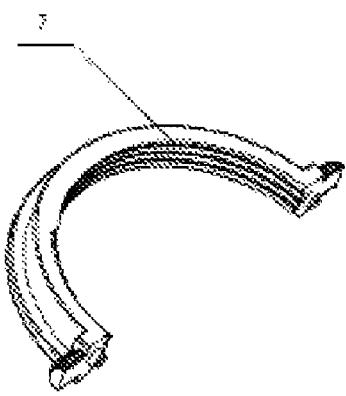
FIG. 15 is a schematic diagram illustrating the assemblies of the fixed ring according to the present invention.
Figure 16:
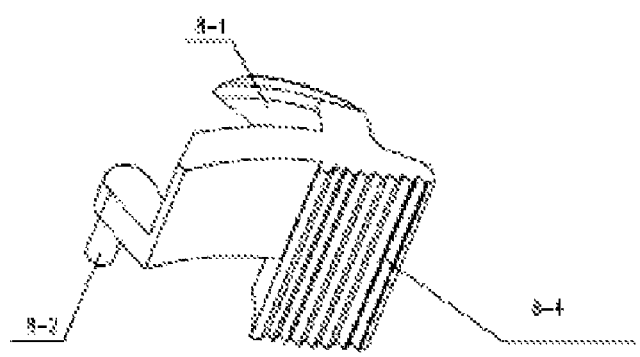
FIG. 16 is a schematic diagram illustrating the structure of the fixing piece according to the present invention.

With reference to FIGS. 1-16, wherein the present invention discloses a rotation angle sensor comprising a movable sleeve 1, a fastening structure 2 that connects arc-shaped components, and a box 3 that is movably attached to the movable sleeve 1. The box3 comprises a base 3-1 and a dust-proof hood 3-2, wherein the end part of the box 3 extends as a semicircular fixing structure 3-3 corresponding to the movable sleeve 1. The top end of the semicircular fixing structure 3-3 is connected to a corresponding semicircular ring 3-4, wherein the inner side of the semicircular ring 3-4 and the semicircular fixing structure 3-3 are uniformly disposed of a plurality of rolling bodies 3-5 around the shaft center, and the movable sleeve 1 and the rolling bodies 3-5 are movably connected thereof. The box 3 is further disposed of a connecting drawbar 4 at the lateral section thereof to support and fixedly join the whole device to the vehicle stud; wherein the connecting drawbar 4 comprises a front drawbar 4-1, a back drawbar 4-2, and a fixing block 4-3 that hinged with the back drawbar 4-2. The front drawbar 4-1 and the back drawbar 4-2 assemble to form a length adjustable bar component. The fixing block 4-3 sets a conical slot 4-4, and a plurality of holes 4-5 that match with studs of different diameters is disposed therein. Wherein, the fastening structure 2 that connects the arc-shaped component is a ring connecting piece, and the ring connecting piece provides a plurality of supporting columns 2-1 and rivet holes 2-2 along its periphery edge. Riveting column 2-3 inside the rivet hole 2-2 fixedly joins the ring connecting piece to the movable sleeve 1. The ring connecting piece comprises at least two connecting components 2-4 corresponding to the arc-shaped components; wherein the end part of the connecting component 2-4 provides a hole slot 2-5, and between the two adjacent connecting components 2-4, a buckling piece 2-6 that buckles with the hole slot 2-5 is disposed thereof. The upper section of the movable sleeve 1 is disposed of threaded ring 5, wherein the inner side of the threaded ring 5 provides a locking mechanism 6 that is correspondingly connected to the rotating shaft. A fixed ring 7 is screwly connected to periphery edge of the threaded ring 5. The fixed ring 7 is divided into two parts: left and right. The assemblies of the two parts are disposed of corresponding convex pieces and concave slots that match with each other. By the screw lock of a fixing nut 7-1, the two parts are fixedly joined together as a large screw nut component. The movable sleeve 1, the threaded ring 5 of the upper movable ring and the fixed ring 7 of outer threaded ring 5 are all split-ring structures and comprise at least two concentric and coaxial arc-shaped components. The locking mechanism 6 comprises a plurality of fixing pieces 8 that is attached to the inner wall of the threaded ring 5; wherein an engaging component 8-1 provided at the outer surface of the fixing piece 8 engages with the upper section of the movable sleeve 1. The movable sleeve 1 provides a plurality of positioning holes 9, and the bottom of the engaging component 8-1 is disposed of a positioning shaft 8-2 that is capable of movably attaching to the positioning holes 9. A slant surface 8-3 is disposed at the upper section of the engaging component 8-1, and a concave groove 10 is disposed at the lower section of the threaded ring 5 to lodge with the slant surface 8-3 thereof. The fixed ring 7 of the threaded ring 5 presses on the slant surface 8-3 and movably connected therewith. By changing the position of the fixed ring 7, the pressing force applied to the slant surface 8-3 is altered and the positioning shaft 8-2 sways in the positioning hole 9, thereby changes the shaft diameter limited by the threaded ring 5 and the fixing piece 8, allowing adaptation to steering wheel connecting shafts of different diameters. The inner surface of the fixing piece 8 is an anti-skid surface 8-4 corresponding to the surface of the rotating shaft; the anti-skid surface is disposed of cogs. Cogs 11 are disposed along the periphery edge of the movable sleeve 1, and the box 3 provides a gear reduction device 12 comprising multi grade gears. The gear reduction device 12 is fixedly joined to a circuit board component 13, wherein a sensing component is adjacently connected thereof. The gear set of the gear reduction device 12 and the cogs 11 form a five-grade gear reduction structure to achieve a low rotation ratio conversion, wherein the sensing component near the structure uses non-contact sensing electromechanical transformation circuit to obtain an accurate rotation angle data. The non-contact sensing electromechanical transformation circuit provides a sensing data output wire 14, wherein the data output wire 14 is disposed at the end part of the box 3. After the external analysis, the obtained data is displayed on a monitor or other meters in different forms.

During the using process, the fixed ring 7 is attached to the steering wheel U-joint connecting shaft, and the movable sleeve 1 and the fastening structure are opened to lodge in the connecting shaft in half-opened condition. The movable sleeve 1 is closed at the lower section of the fixed ring 7, and the buckling piece is buckled. The fixed ring 7 is rotated to attach it on the threaded ring 5; when the fixed ring 7 is joined to the threaded ring 5 in a different position, the fixing piece is also at a different position. And then the box 3 is connected to the movable sleeve 1. At this process, the end part of the box 3 and the semicircular fixing structure which is extended toward outside installs the semicircular ring corresponding to the semicircular fixing structure into the box 3 in a parallel direction from the sensing component, and then screw lock the structure with two screw nuts. Finally, the connecting shaft is installed thereon and the angle and length are adjusted to join the other end of the connecting shaft to the vehicle stud.

While the invention has been described with reference to a preferred embodiment thereof, it is to be understood that modifications or variations may be easily made without departing from the spirit of this invention, which is defined in the appended claims.

What is claimed is:

1. A rotation angle sensor, comprising:
a movable sleeve that fits with a rotating shaft and movably attached to a box; wherein the upper section of the movable sleeve is disposed of threaded ring, and the inner side of the threaded ring provides a locking mechanism that is correspondingly connected to the rotating shaft; a fixed ring is screwly connected to periphery edge of the threaded ring, and the movable sleeve, the threaded ring and the fixed ring are all split-ring structures and comprise at least two concentric and coaxial arc-shaped components; cogs are disposed along the periphery edge of the movable sleeve, and the box provides a gear reduction device comprising multi grade gears matched by cogs; the gear reduction device is fixedly joined to a circuit board component, wherein a sensing component is adjacently connected thereof.

2. The rotation angle sensor according to claim 1, wherein the arc-shaped component has a ring connecting piece movably disposed at the bottom thereof, wherein the ring connecting piece provides a plurality of rivet holes along its periphery edge; a riveting column inside the rivet hole fixedly joins the ring connecting piece to the movable sleeve.

3. The rotation angle sensor as defined in claim 2, wherein the ring connecting piece comprises at least two connecting components corresponding to the arc-shaped components; wherein the end part of the connecting component provides a hole slot, and between the two adjacent connecting components, a buckling piece that buckles with the hole slot is disposed thereof.

4. The rotation angle sensor according to claim 1, wherein the locking mechanism comprises a plurality of fixing pieces that being attached to the inner wall of the threaded ring, wherein an engaging component provided at the outer surface of the fixing piece engages with the upper section of the movable sleeve; the internal movable sleeve provides a plurality of positioning holes, and the bottom of the engaging component is disposed of a positioning shaft that is capable of movably attaching to the positioning holes; a slant surface is disposed at the upper section of the engaging component, and a concave groove is disposed at the lower section of the threaded ring to lodge with the slant surface thereof; the fixed ring of the threaded ring presses on the slant surface and movably connected thereon.

5. The rotation angle sensor according to claim 4, wherein the inner surface of the fixing piece is an anti-skid surface corresponding to the surface of the rotating shaft; wherein the anti-skid surface is disposed of cogs.

6. The rotation angle sensor as defined in claim 1, wherein the box comprises a base and a dust-proof hood, and the end part of the box extends as a semicircular fixing structure corresponding to the movable sleeve; the top end of the semicircular fixing structure is connected to a corresponding semicircular ring, wherein the inner side of the semicircular ring and the semicircular fixing structure are disposed of a plurality of rolling bodies around the shaft center, and the movable sleeve and the rolling bodies are movably connected thereof.

7. The rotation angle sensor as defined in claim 1, wherein the box is further disposed of a connecting drawbar at the lateral section thereof to support and fixedly join the whole device to the vehicle stud; wherein the connecting drawbar comprises a front drawbar, a back drawbar, and a fixing block that hinged with the back drawbar; the front drawbar and the back drawbar assemble to form a length adjustable bar component.

8. The rotation angle sensor as defined in claim 7, wherein the fixing block sets a conical slot, and a plurality of holes that match with studs of different diameters is disposed therein.

9. The rotation angle sensor as defined in claim 1, wherein the gear set of the gear reduction device and the cogs disposed along the periphery edge of the movable sleeve form a five-grade gear reduction structure, wherein the sensing component near the structure uses the non-contact sensing electro-mechanical transformation circuit.

\* \* \* \* \*